UNITED STATES PATENT OFFICE.

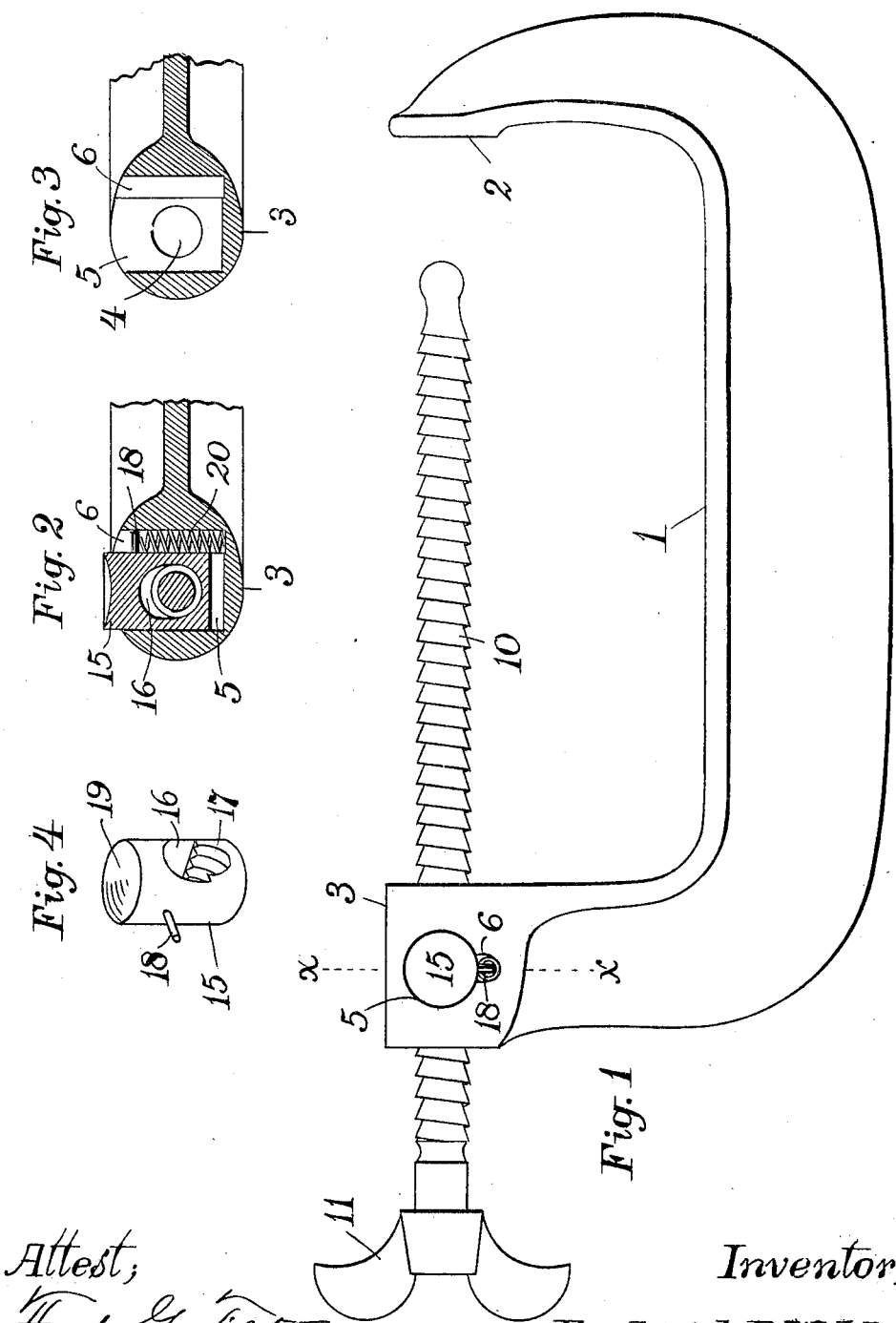

FREDERICK E. WALDEN, OF WORCESTER, MASSACHUSETTS.

RATCHET-CLAMP.

No. 856,436.   Specification of Letters Patent.   Patented June 11, 1907.

Application filed March 5, 1906. Serial No. 304,219.

*To all whom it may concern:*

Be it known that I, FREDERICK E. WALDEN, a citizen of the United States, and a resident of the city and county of Worcester, in the Commonwealth of Massachusetts, have invented certain new and useful Improvements in Ratchet-Clamps, of which the following is a full, clear, and exact description.

This invention pertains to that type of clamp in which a substantially C-shaped member is provided with a clamping-screw turning in a suitable nut or threaded opening in one branch of said member, and directed toward the opposite branch thereof.

The object of this invention is the effecting of improved means whereby such screw can at will be set free of the confining threads for quick adjustment, and then put into engagement therewith for the clamping action.

Referring to the drawings forming part of this specification, Figure 1 is a side view of a clamp embodying my invention. Fig. 2 is a sectional view on the line X—X in Fig. 1. Fig. 3 is a similar sectional view, but with the operating parts removed. Fig. 4 is a perspective view of the screw-engaging and disengaging nut.

The C-shaped clamping member 1 is formed in substantially the usual manner with the work-engaging arm 2, and the screw-holding-arm 3. Through the latter is a smooth hole 4, shown in Fig. 3, for the free passage of the screw 10. Cutting the hole 4 transversely, is a cylindrical recess 5 having at one side thereof a similar recess 6 but smaller in diameter; the latter opening into the former throughout more or less of its height. In the recess 5 is located a cylindrical nut 15 the upper half of the threads 17 of which is cut away, and recessed for a distance double that of the threads. In the recess 6 is placed a coiled spring 20 the upper end of which presses against the pin 18 projecting from said cylindrical nut. This pressure is made sufficient to hold the screw threads 17 in mesh with the screw 10 when the clamp is being used, and to insure against any accidental dislodgment thereof. To release the screw from said nut and permit it to be freely moved longitudinally, the cylindrical nut is pressed inward until its threads 17 are disengaged from the threads of said screw. Then, while holding said nut thus depressed, the clamping-screw can be moved back and forth as desired. The outer end of said nut is made somewhat dishing, as shown at 19, in Figs. 2 and 4, for better fitting the thumb of the person depressing it.

By having the spring 20 press upward against the pin 18 at one side of the nut 15, the latter is given an uneven tilt which tends strongly to bind the nut in its recess 5 and so insure against accidental disengagement between its threads and those of the screw, when the same become worn from use and the clamp is subjected to unusual strain. Inasmuch as the user's thumb is applied to the nut 5 directly in line with the center thereof, there is no such binding when depressing the nut in the operation of releasing the screw therefrom. To further insure against accidental slip between the nut and screw when under strain, I prefer to have the threads of the screw made ratchet-shaped, with the vertical faces of the threads at the sides toward the thumb-head 11. This also permits of the equally important function of permitting the screw to be pressed inward without stopping to disengage the nut therefrom as above described. It is this latter arrangement which gives to my invention the distinguishing name of a ratchet clamp.

What I claim as my invention and for which I desire Letters Patent is as follows, to wit:—

A clamp formed at one end with a pair of cylindrical recesses of unequal diameter extending transverse of the length of the clamp and arranged so that the larger recess communicates with the smaller, a cylindrical nut fitting slidably in the larger recess and having the upper half of its threads cut away, a screw engaging the threads of said nut, an outwardly projecting pin on one side of said nut extending in said smaller recess, said nut constituting a closing wall for said smaller recess, a coil spring seating on the wall at the lower end of said smaller recess and engaging said pin, said projecting pin of the nut being located at a point adjacent the upper end of said smaller recess and at a point at a distance from the point of engagement between the screw and the threads of the nut, whereby said spring will tend to tilt said nut.

In testimony that I claim the foregoing invention, I have hereunto set my hand this third day of March, 1906.

FREDERICK E. WALDEN.

Witnesses:
 A. B. UPHAM,
 FRED G. TILTON.